W. JAY.
SIGNAL DEVICE FOR AUTOMOBILES.
APPLICATION FILED NOV. 12, 1915.
1,330,076.
Patented Feb. 10, 1920.
2 SHEETS—SHEET 2.
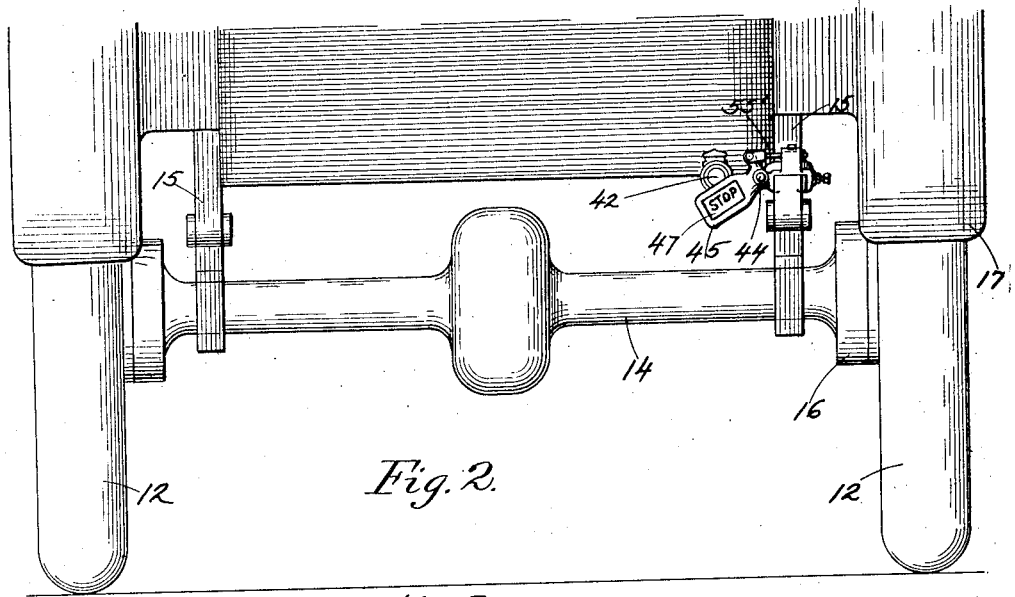
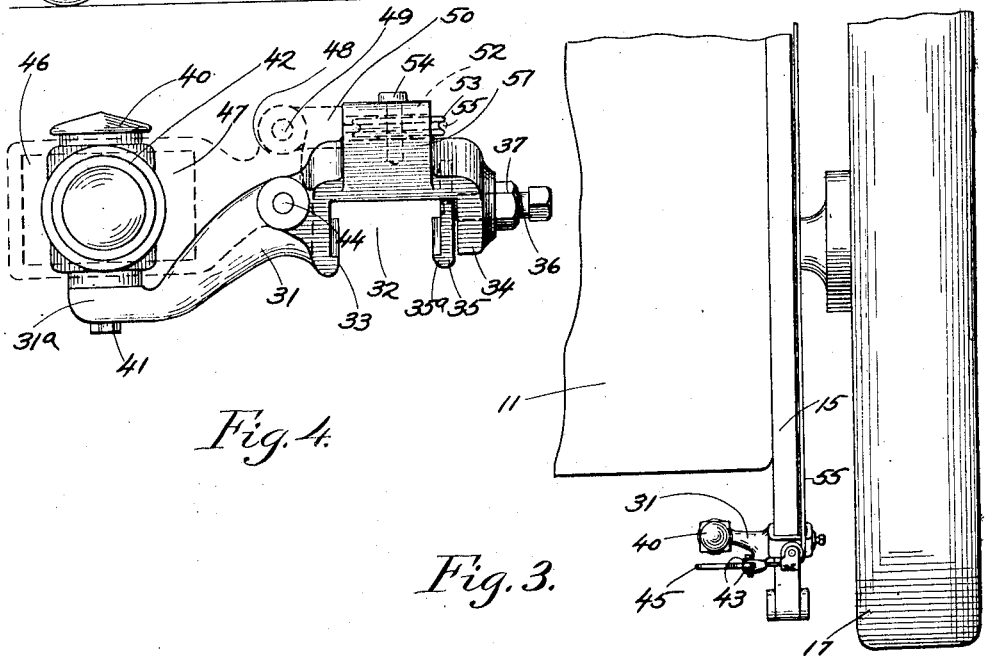
Witness:
C. E. Burnap
Inventor:
Webb Jay
By Sheridan, Wilkinson & Scott, Att'ys

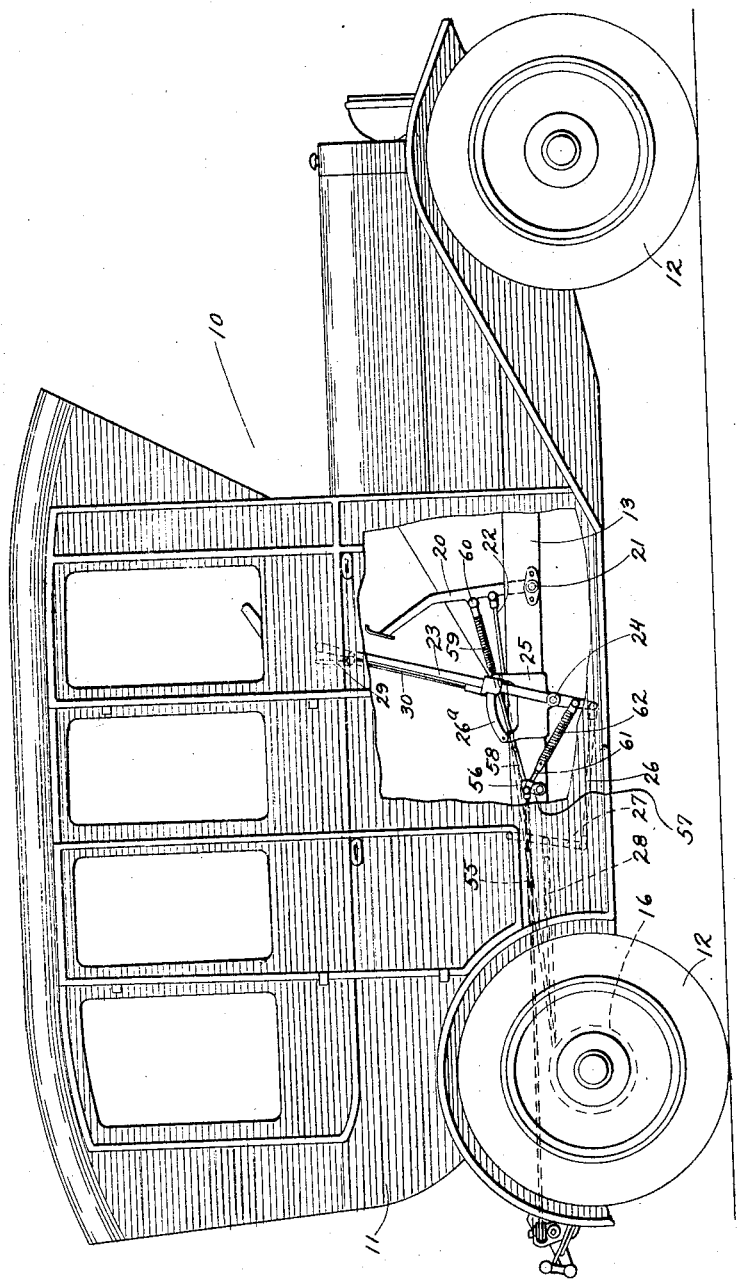

UNITED STATES PATENT OFFICE.

WEBB JAY, OF CHICAGO, ILLINOIS.

SIGNAL DEVICE FOR AUTOMOBILES.

1,330,076.	Specification of Letters Patent.	Patented Feb. 10, 1920.

Application filed November 12, 1915. Serial No. 61,122.

*To all whom it may concern:*

Be it known that I, WEBB JAY, a citizen of the United States, residing at Chicago, in the county of Cook and State of Illinois, have invented certain new and useful Improvements in Signal Devices for Automobiles, of which the following is a specification.

This invention relates to signal devices for automobiles, and in particular to an automatic signal device adapted for use in warning persons adjacent an automobile of the intention of the driver thereof.

It is now common practice for drivers of vehicles to give warning of a change of speed or approaching change of direction to other persons following or approaching, by holding out one hand as a signal. This method of signaling is indefinite, not universally understood, and capable of being unnoticed or misconstrued.

The principal object of my invention is to provide means for conveying to other persons or drivers, information regarding the intention of the driver of a vehicle as to a change of speed, or course, of that vehicle. A further object is to provide a signal device for use with automobiles, and the like, to indicate automatically a change of speed, or course, of the automobile. Still another object is to provide, in combination with the speed control mechanism of a vehicle, a signal adapted to be actuated automatically by the operation of said mechanism to indicate a change of speed of the vehicle to persons following or adjacent to the vehicle. Another feature is the provision of such a signaling device arranged to be actuated by the operation of any one of a plurality of speed controlling elements carried by the automobile.

These and other objects of the invention will appear more clearly from the following specification taken in connection with the accompanying drawings, in which certain embodiments of the invention are illustrated.

In the drawings:

Figure 1 is a side elevation of an automobile with a portion thereof broken away, showing the general arrangement and connections of my signaling device;

Fig. 2 is a rear elevation of an automobile showing the signal proper mounted thereon;

Fig. 3 shows a top plan view of the structure illustrated in the right-hand part of Fig. 2;

Fig. 4 is an enlarged rear elevation of the signal proper showing the movable elements thereof by dotted lines.

In the drawings, the automobile designated generally by the numeral 10 is shown as comprising a body 11, wheels 12, side frame 13, rear axle 14, springs 15, brake housings 16, and fenders 17. These elements form no part of my present invention and are illustrated merely for the purpose of showing the application thereto of my invention.

The usual brake lever 20 adapted to be operated by the foot of the driver to control the ordinary brakes of the automobile, is mounted in bearings 21 and connected from an intermediate point by means of the link 22 to the usual brake mechanism. The emergency brake lever 23 is pivoted at 24 to the plate 25 carried by the side frame member 13 and the lower extremity of the lever 23 is pivotally connected by a link 26 to the arm 27 which is pivotally mounted on the body of the machine. The link 28 connects the arm 27 to the emergency brake mechanism contained within the housing 16. The plate 25 carries a notched quadrant 26ª which is adapted to be engaged at a suitable point by a spring actuated pawl of well known form carried by the lever 23 and actuated by the hand latch 29, operatively connected thereto through the link 30. It is of course understood that the clutch pedal or lever may be connected by yielding means to the socket member 56 in the same manner that levers 20 and 23 are connected.

The effect of the operation of either of the levers 20 or 23 is to change the speed of the automobile and it is the purpose of my invention to provide means for furnishing an indication of this change of speed to persons following the vehicle to which my invention is applied. For this purpose I have provided means in combination with the tail lamp of the automobile, for instance, arranged to be actuated automatically by the operation of the brake levers or other speed controlling mechanism to provide the proper indication of the change of speed.

The tail lamp bracket 31 is provided with a rectangular slot 32 which is adapted to receive the vehicle spring 15 or other suitable supporting member of the automobile.

One wall of the notch 32 is provided with a hook 33 which is adapted to coact with a portion of the under-side of the vehicle spring, and mounted inwardly from the other wall 34 of the notch 32 is a movable plate 35 having a hooked extremity 35ª adapted to engage a portion of the under-side of the spring opposite the hook 33. The plate 35 is slidably mounted and is rotatably engaged by a stud 36 which may be adjusted to clamp the vehicle spring securely between the plate 35 and the opposite wall of the slot 32. When the bracket 31 has thus been clamped in position it may be secured against movement therefrom by means of the lock-nut 37 engaging the stud 36.

The bracket 31 extends inwardly and downwardly from the vehicle spring terminating at its inner end in the substantially horizontal portion 31ª having the flat upper surface upon which the lamp 40 is adapted to be seated. This lamp is secured in position on the bracket by means of a stud or bolt 41 which engages the bracket and the base of the lamp. The lamp 40 is provided with a rearwardly facing aperture 42 over which a glass or screen of suitable color, usually red, is placed and through which the light of the lamp is transmitted as a signal visible to persons following at the rear of the vehicle. The lamp 40 is adapted to give a substantially constant indication during the normal operation of the vehicle, but when the speed of the vehicle changes the indication of this lamp will be altered by the means which I have provided for that purpose. The bracket 31 has formed integrally therewith two parallel vertically extending ears 43 between which a signal arm target or plate 45 is pivotally mounted by means of a pin 44. This arm or plate 45 is provided with an aperture 46 over which is placed a screen 47 of translucent material of suitable color, such for instance, as yellow, having printed thereon the word "Stop" or other suitable symbol adapted to warn persons following the vehicle that the speed thereof is about to be decreased preparatory to stopping or changing the course of the vehicle. During the normal operation of the vehicle the arm 45 will assume the downwardly inclined position, as shown in Fig. 2, in which position the translucent screen 47 will not be illuminated, so that the signal will give no indication, except the normal indication given by the lamp 40 serving as a tail light of the vehicle. However, when the plate 45 is lifted about its pivotal mounting, so as to assume the substantially horizontal position illustrated by dotted lines in Fig. 4, the screen 47 will be illuminated by the light projected through the aperture 42 of the lamp, thereby indicating that some change in the then normal operation of the vehicle is about to occur and thus serving as notice to the following vehicles to proceed with caution giving a signal that the speed or course of the vehicle is being, or about to be, changed.

The signal arm or plate 45 is actuated by the mechanism now to be described. The plate 45 has extending upwardly therefrom a projection 48, which is pivotally connected at 49 with the member 50. Extending upwardly from the bracket 31 is a plate 51 having a forwardly directed flange 52. A pulley 53 is rotatably mounted on the pin 54 between the flange 52 and the body of the bracket. A flexible cable 55 is secured to the member 50, extends around the pulley 53, and thence forwardly at the side of the body of the vehicle, being secured at its forward end to the socket member 56, which is carried by an arm 57 pivotally mounted on the side frame 13. A link 58 is connected to the socket member 56 at one end, and at the other end to a coil spring 59. The opposite end of the coil spring 59 is pivotally connected at 60 to the brake lever 20 at a point above the bearing 21 of said lever. A second link 61 is connected to the socket member 56 at one end, and at the other end to a second coil spring 62, which last-named coil spring is connected at the end thereof opposite the link 61 to the emergency brake lever 23 below the pivotal point 24.

It will be apparent that when the brake lever 20 is moved forwardly to set the brakes of the automobile the socket member 56 will be moved forwardly through the connecting link 58 and spring 59, and this motion will be transmitted through the cable 55 to the member 50, which will be operated to rotate the signal plate or arm 45 upwardly about its pivotal axis 44, so as to bring the translucent screen 47 of said plate in position opposite the lamp 40, as shown in Fig. 4. After the plate or arm 45 has been moved upwardly to the position shown in Fig. 4 the member 50 will coact with the plate 51 of the bracket, thus limiting the upward movement of the signal plate, and any continued forward movement of the brake lever 20 thereafter to set the brakes will be permitted by the extension of the spring 59. It will be understood that the spring 59 is preferably of sufficient strength so that the first movement of the brake lever will actuate the signal arm 45 to indicate that the speed of the vehicle is about to be changed, but the spring should not be so strong as to prevent the continued actuation of the brake lever to set the brakes without undue effort on the part of the driver. If desired, the parts may be proportioned to cause the signal to be actuated at some other point in the operation of the speed control mechanism.

Similarly, when the emergency brake lever 23 is operated in a rearward direction to set the emergency brakes, so that the forward end thereof moves forwardly, the socket member 56 will be moved forwardly through the connecting link 61 and coil spring 62 to actuate the signal member in the manner just described. This may be done without the necessity of operating the foot lever 20, by which the ordinary brakes are actuated, since the spring 59 will permit the necessary movement of the socket member 56 without any movement of the lever 20. On the other hand, when the emergency brake lever 23 has been locked in position, by causing the pawl carried thereby to engage a notch in the quadrant 26, the foot lever 20 may be actuated to set the signal and operate the brakes, the spring 62 permitting the necessary movement of the socket member 56 without a corresponding movement of the lever 23. It will thus be apparent that either of the speed control levers may be actuated independently of the other, and whichever lever is actuated the signal device will be automatically operated to give the required signal to persons following the vehicle, without the necessity of any attention thereto on the part of the driver. When the speed control levers are returned to inoperative positions, the plate 45 will fall by gravity to the inoperative position shown in Fig. 2. The mechanism connected to the member 50 limits the downward movement of the plate 45, or the bracket 31 may be provided with a suitable lug for that purpose.

It will be apparent that a signal is automatically given when any speed control device is operated to warn persons at the rear of the vehicle that the speed thereof is being changed, preparatory to stopping or changing the course of the vehicle. For instance, when the vehicle approaches a street crossing, the actuation of the signal will indicate that the vehicle is slowing up to permit traffic to pass on the cross street, or for the purpose of turning the corner into the cross street. This form of signaling device has the advantage that it is automatic in its operation, not requiring the conscious attention of the driver, and that it gives a uniform indication which is capable of being understood by anyone.

Although I have shown and described certain forms of my invention for purposes of illustration, it will be understood that it may be embodied in other forms without departing from the scope of my invention as defined in the appended claims.

What I claim is:—

1. In a device of the class described, in combination, a lamp, a bracket adapted to adjustably secure said lamp to a vehicle, an arm pivoted on said bracket and adapted to be vertically oscillated in front of said lamp, the arm when in non-signaling position adapted to rest below said lamp and for signaling to be raised against gravital action, a stop on said bracket adapted to be engaged by said arm when in full signaling position to prevent further movement thereof, and means associated with the control members of the vehicle whereby on movement of any one of said members said arm is oscillated to signaling position, said actuating means including a single flexible non-elastic member connected at one end to said arm, and resilient members connecting the other end of said non-elastic member with every one of said control elements.

2. In a device of the class described, in combination, a lamp, a bracket for supporting said lamp on a vehicle, and an arm adapted to oscillate in a vertical plane in front of said lamp to indicate different signals, said arm adapted when in non-signaling position to lie below said lamp, and means for oscillating said arm in front of said lamp against gravital action, said means including a flexible non-elastic member and a flexible elastic member, and a stop adapted to be engaged by said arm when in signaling position to prevent further movement thereof.

In testimony whereof I have subscribed my name.

WEBB JAY.